(12) United States Patent
Glaesser et al.

(10) Patent No.: US 12,097,823 B2
(45) Date of Patent: Sep. 24, 2024

(54) BELT RETRACTOR HAVING AN ELECTRICALLY ACTUATABLE LOCKING DEVICE

(71) Applicant: AUTOLIV DEVELOPMENT AB, Vargarda (SE)

(72) Inventors: Antto-Christian Glaesser, Hasloh (DE); Florian Kunzler, Elmshorn (DE); Philip Rings, Norderstedt (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 294 days.

(21) Appl. No.: 17/753,661

(22) PCT Filed: Sep. 3, 2020

(86) PCT No.: PCT/EP2020/074519
§ 371 (c)(1),
(2) Date: Mar. 10, 2022

(87) PCT Pub. No.: WO2021/047982
PCT Pub. Date: Mar. 18, 2021

(65) Prior Publication Data
US 2022/0332280 A1    Oct. 20, 2022

(30) Foreign Application Priority Data
Sep. 12, 2019   (DE) .................... 10 2019 213 915.9

(51) Int. Cl.
*B60R 22/34*    (2006.01)
*B60R 22/343*   (2006.01)
*H01F 7/08*     (2006.01)

(52) U.S. Cl.
CPC ........... *B60R 22/343* (2013.01); *H01F 7/081* (2013.01)

(58) Field of Classification Search
CPC ...... B60R 22/34; B60R 22/341; B60R 22/343
See application file for complete search history.

(56) References Cited

U.S. PATENT DOCUMENTS

| 4,895,317 A | * | 1/1990 | Rumpf ................. | B60R 22/343 |
| | | | | 242/384 |
| 5,538,098 A | * | 7/1996 | Sparhawk ............ | B60R 22/343 |
| | | | | 280/806 |
| 5,779,178 A | * | 7/1998 | McCarty .............. | B60R 22/343 |
| | | | | 242/384 |

FOREIGN PATENT DOCUMENTS

| GB | 2398824 A | 9/2004 |
| GB | 2398824 B | 9/2005 |

* cited by examiner

*Primary Examiner* — Sang K Kim
(74) *Attorney, Agent, or Firm* — DICKINSON WRIGHT PLLC

(57) ABSTRACT

A belt retractor having an electrically actuatable locking device comprising a housing with a base plate and an upright first limb, a locking lever mounted pivotably on the upright first limb with a steel plate which is spring-loaded, and an electromagnet arranged in the housing and having a coil with a through opening, a first iron core which is arranged in the through opening, when a voltage is applied to the coil, exerts a magnetic force on the locking lever via the steel plate and actuates the locking lever for triggering a locking or unlocking movement against the force of the spring. The movement of the locking lever is enforced by a first magnetic circuit formed by the first iron core, the upright first limb and the portions of the base plate and of the locking lever between the first iron core and the upright first limb.

12 Claims, 5 Drawing Sheets

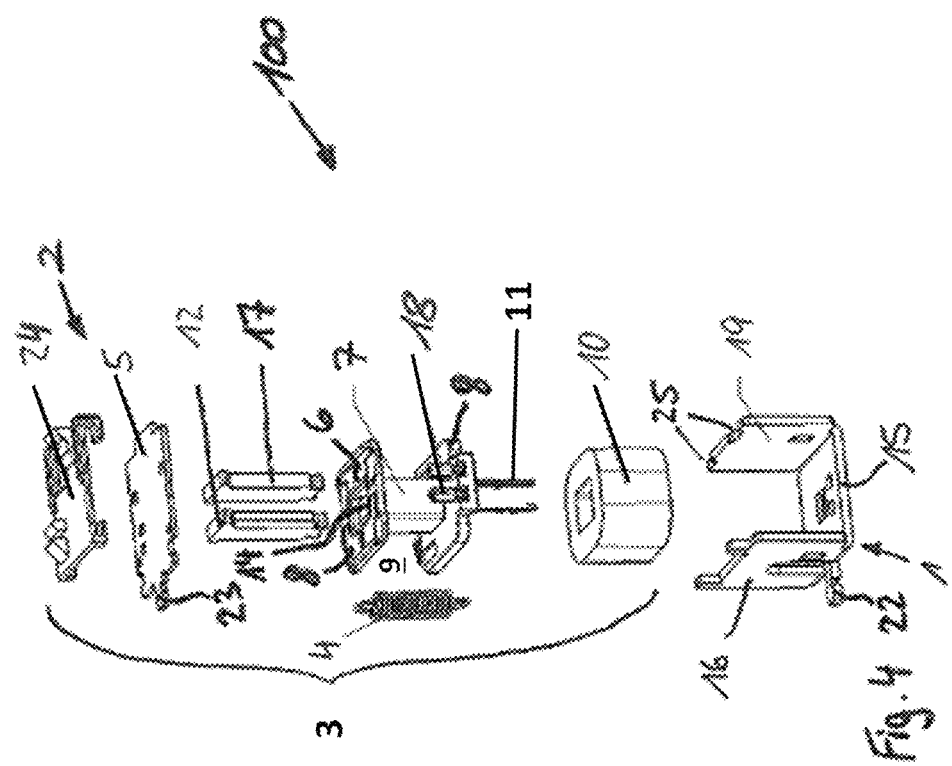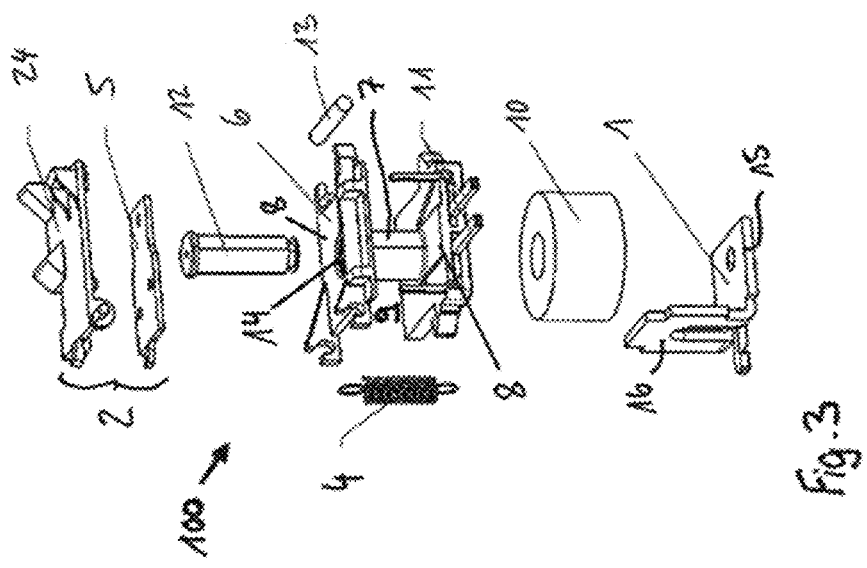

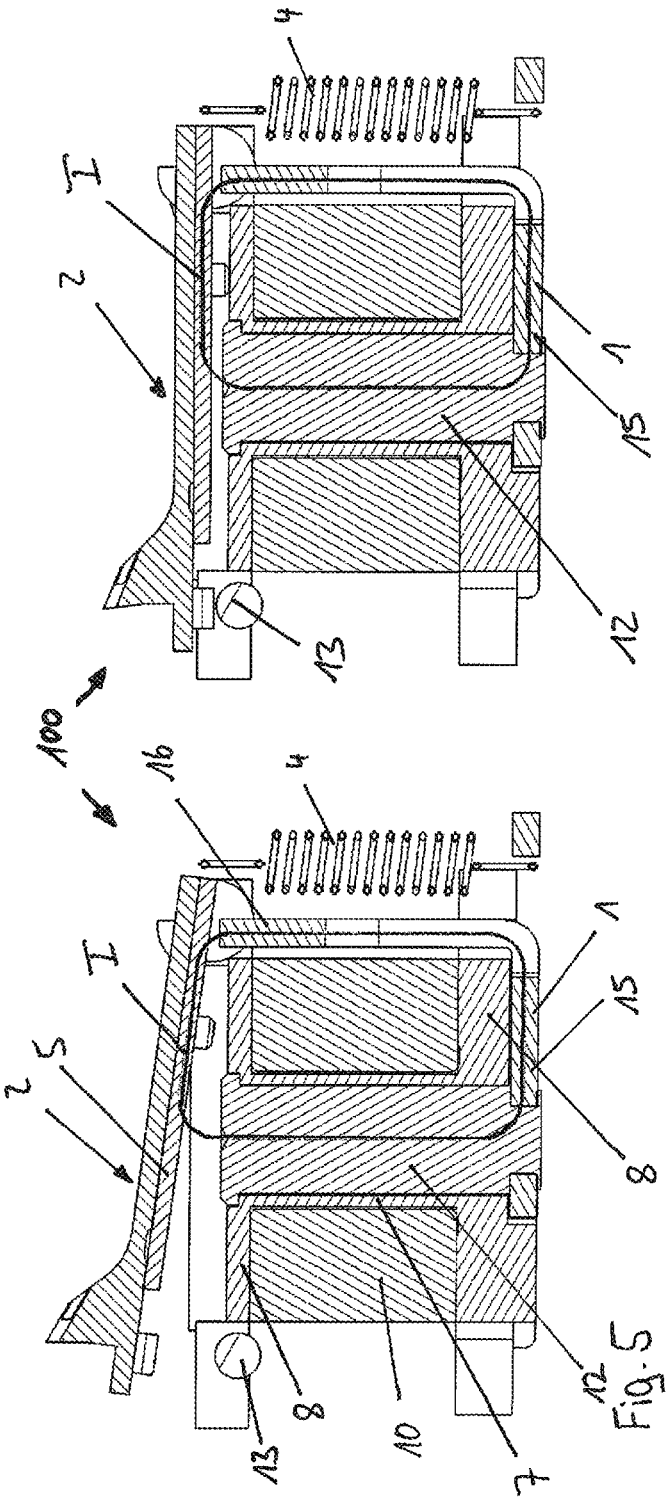

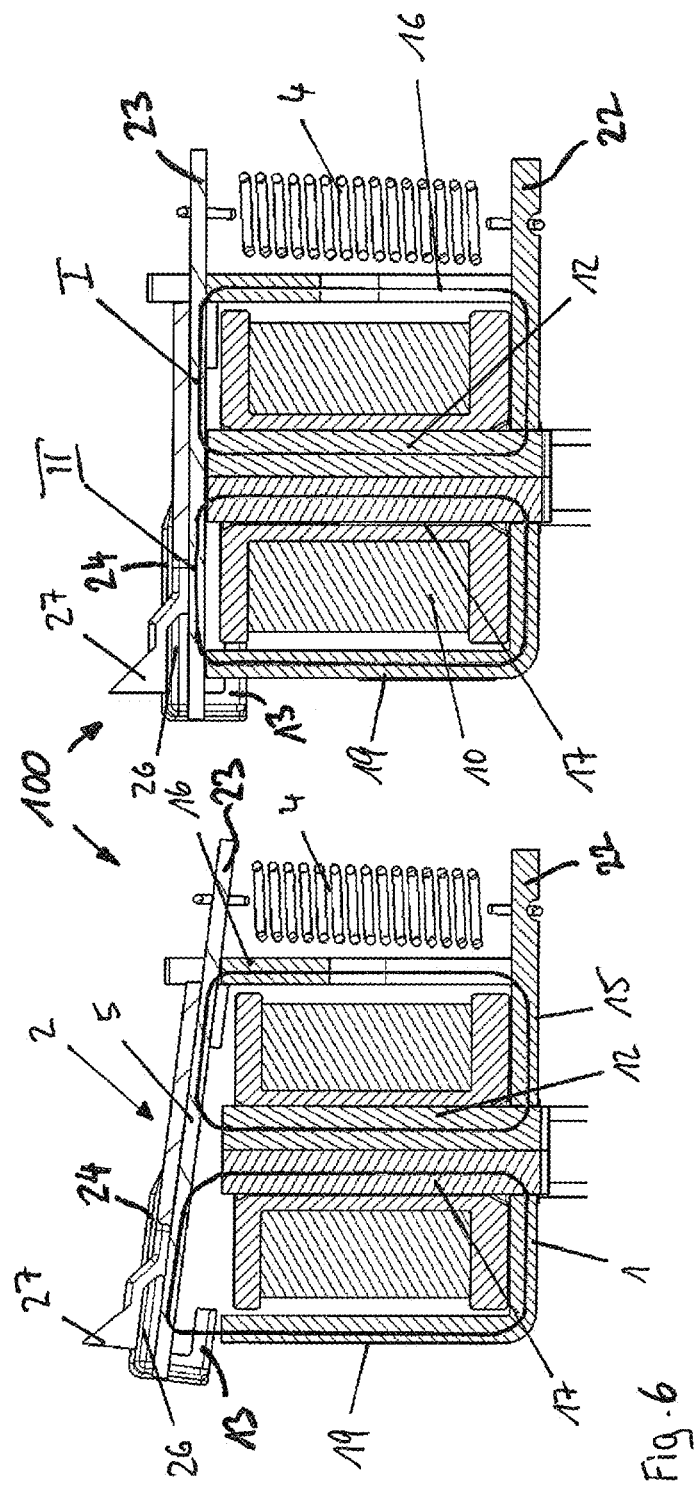

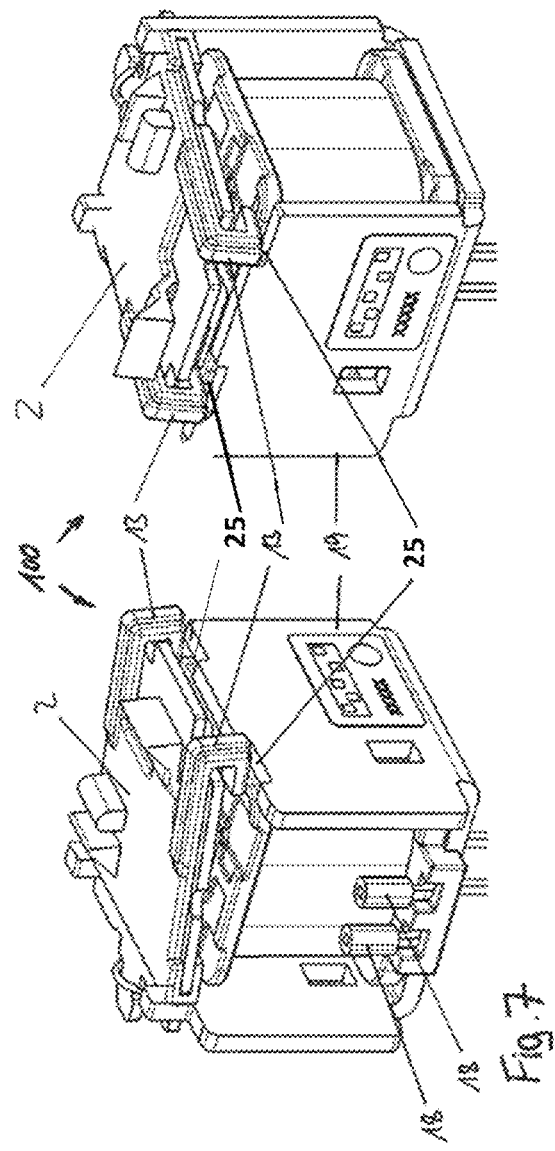

BELT RETRACTOR HAVING AN ELECTRICALLY ACTUATABLE LOCKING DEVICE

CROSS-REFERENCE TO RELATED APPLICATIONS

This application is a 35 U.S.C. § 371 national phase of PCT International Application No. PCT/EP2020/074519, filed Sep. 3, 2020, which claims the benefit of priority under 35 U.S.C. § 119 to German Patent Application No. 10 2019 213 915.9, filed Sep. 12, 2019, the contents of which are incorporated herein by reference in its entirety.

FIELD

The present invention relates to a belt retractor having an electrically actuatable locking device comprising the features of the preamble of claim 1.

BACKGROUND

A generic electrically actuatable locking device is known, for example, from GB 2 398 824 A.

Such locking devices are used to stop an externally toothed control disk with respect to the belt shaft, which disk is rotatably mounted on a belt shaft of the belt retractor, and to thereby force a locking pawl into a gearing fixed to the vehicle to generate an actuating movement, whereby the belt shaft is in turn locked in the extraction direction.

In conventional mechanical locking devices, an inertial mass is mounted on a contact surface which is deflected when a predetermined vehicle deceleration is exceeded and thereby deflects the locking lever and forces it to engage in the gearing of the control disk. Such mechanical locking devices are also referred to as vehicle-sensitive sensor devices. One problem of these mechanical locking devices is that the inertial mass always has to be aligned in a defined orientation on the contact surface with respect to the vehicle longitudinal axis and the vehicle transverse axis independently of the installation geometry of the belt retractor, so that the belt shaft is not unintentionally locked. Thus, the belt retractor must be individually designed for the vehicle in that the orientation of the contact surface and the mass applied thereto is individually designed for the belt retractor such that it corresponds to the predetermined orientation taking into account the installation geometry of the belt retractor in the vehicle. Furthermore, in the case of belt retractors integrated in the front seats, such as in the case of convertibles, there is the problem that, when the inclination angle of the backrest is adjusted or when the backrest is folded forward to climb into the back seats, the inertial mass is unintentionally deflected on the contact surface and, as a result, the locking lever is unintentionally forced into the external teeth of the control disk to generate an actuating movement. The belt retractor is thus locked in the extraction direction and the backrest cannot be pivoted further or the occupant cannot buckle the seat belt. In order to avoid this, additional disconnection mechanisms or compensation mechanisms must be provided, which, however, may only act in these cases so that the occupant is always restrained in an accident. Due to these tasks to be achieved, such a mechanical locking device is mechanically very complex.

In the case of an electrically actuatable locking device, as is known, for example, from GB 2 398 824 A, the movement of the locking lever is in contrast electrically controlled, as a result of which the previously required inertial mass is omitted. The belt retractor can thereby be mounted unchanged in different installation positions in the vehicle and also in backrests. Furthermore, the locking of the belt shaft can be controlled by an electrical signal originating from a control device. The signal can thereby be generated by a control device, which can also generate the signal as a function of other sensor devices or control systems. For example, it is conceivable to automatically lock the belt shaft when a driving dynamics assistance system is activated, which is controlled, for example, as a function of a signal of an optical sensor device. The electrical locking device is thus also controlled directly or indirectly as a function of the signal of the optical sensor device.

An electrically actuatable locking device 100 used by the applicant in their products and corresponding to the embodiment of GB 2 398 824 A is shown in FIGS. 3 and 5. The electrically actuatable locking device 100 comprises as base elements a housing 1 with an L-shaped basic structure having a base plate 15 and an upright first limb 16, a locking lever 2 pivotably mounted on the upright first limb 16 of the housing 1, an electromagnet 3 and a spring 4, which is held at one end on the housing 1 and is connected at the other end to an end of the locking lever 2 projecting outward from the upright first limb 16. The spring 4 is designed as a tension spring such that it biases the locking lever 2 into a position in which it engages in external teeth of a control disk 21 and thereby restrains the control disk 21 with respect to the belt shaft. In this way, when the belt shaft is rotated in the extraction direction, the locking pawl is automatically forced into a gearing fixed to the vehicle to generate an actuating movement, and the belt shaft is subsequently locked against a further belt extraction. The locking lever 2 comprises a contour part 24 and a steel plate 5, wherein the steel plate 5 faces the electromagnet 3 so that the locking lever 2 is attracted by the electromagnet 3 when the latter is energized, and is thus pulled out of the external teeth of the control disk 21. As a result, the belt shaft is subsequently freely rotatable in the extraction and retraction direction. The advantage of this solution is that the belt shaft is locked in the extraction direction, even in the event of a power failure or a defect of the electromagnet 3, and the occupant is also reliably restrained in this case.

The electromagnet 3 comprises a base component 6 with a column-shaped central portion 7 and two radial flanges 8, one of which in each case projects radially outward at one of the ends of the central portion 7. The electromagnet 3 is held with the base component 6 on the base plate 15 of the housing 1. The base component 6 has a tubular through portion 14 in the central portion 7 and an annular intermediate space 9 radially on the outside on the central portion 7, wherein the annular intermediate space 9 is limited toward the ends the central portion 7 by the radial flanges 8. Furthermore, the electromagnet 3 comprises a coil 10 having a plurality of windings, which coil is arranged in the annular intermediate space 9 and is electrically contacted with an external control device via lines 11 provided in the base component 6. In addition, the electromagnet 3 comprises a first iron core 12, which is arranged in the tubular through portion 14 of the base component 6 and has a free end that faces the steel plate 5 of the locking lever 2.

When the coil 10 is energized, the locking lever 2 is attracted by closing a first magnetic circuit I, which is defined by the upright first limb 16 of the housing 1, the first iron core 12 and the portions of the locking lever 2 and the base plate 15 between the first iron core 12 and the upright first limb 16, as can be seen in the right-hand representation of FIG. 5.

SUMMARY

It is an object of the invention to provide a belt retractor having an electrically actuatable locking device which is improved with respect to the locking movement and the force conditions.

In order to achieve the object, a belt retractor with the features of claim 1 is proposed. Further, preferred embodiments of the invention can be found in the dependent claims, the figures and the associated description.

According to the basic idea of the invention, it is proposed that the damping element be formed by at least one elastically deformable hook arranged on the locking lever. The damping element is thus arranged directly on the locking lever, and thereby damps the movement of the locking lever directly as soon as it comes to rest with the hook against the housing. Due to its shape, dimensioning and selected material, the hook itself is elastic and, as a result, can deform into itself as soon as it comes to rest against a counter surface of the housing.

In this case, the hook can preferably be formed by a plastic hook integrally molded onto the locking lever, whereby the intended damping of the locking lever can be realized especially cost-effectively.

It is further proposed that at least one recess is provided on the housing, into which recess the hook dips during its movement in at least one position. The provided recess makes it possible for the locking lever to perform the movement completely without being restricted by the hooks. In addition, the hooks in the recess can form a lateral guide for the locking lever.

It is further proposed that at least two hooks of identical shape are provided and are oriented in parallel to one another. By providing two parallel hooks, the locking lever is damped by two spaced-apart elastic support points, wherein the damping at the two support points is identical in magnitude and orientation.

It is further proposed that the locking lever is formed by a pivotable plate on which an elastic, projecting, bent locking tip is provided. Due to its properties and shape, the elastic, projecting, bent locking tip is elastically arranged on the plate so that it can carry out slight damped movements even when engaged in the gearing of the control disk. As a result, the locking movement of the belt retractor is further damped.

It is further proposed that an upright second limb is provided on the edge side of the base plate opposite the upright first limb, and a second iron core is arranged in the through opening, and the movement of the locking lever is additionally enforced upon activation of the electromagnet by a second magnetic circuit, which is formed by the second iron core, the upright second limb, and the portions of the locking lever and of the base plate between the second limb and the second iron core.

The advantage of the solution can be seen in the fact that the holding force applied by the electromagnet can be increased by simple means without thereby increasing the local maximum load or the installation space requirement of the components involved. Conversely, this makes it possible for a stronger spring to be provided, which in turn enables faster movement of the locking lever when the electromagnet is deactivated. Especially portions of the base plate and of the locking lever, namely the portions between the second iron core and the second limb which had previously been unused, are used for applying the actuating forces. This is made possible especially by providing the second limb and the second iron core. A second magnetic circuit is conveniently produced which, when a preferably identical second iron core and an identical second limb are used, generates approximately the same holding forces as the already present first magnetic circuit. Conveniently, there are two identical magnetic circuits acting in parallel.

It is further proposed that the first and the second iron core are caulked in the base plate of the housing and that the upright first and/or second limb is formed in one piece with the base plate. Both solutions enable cost-effective manufacture, wherein the joint via the caulking requires only the design of an interference fit.

Furthermore, the base plate preferably can have an end portion which is arranged on the side of the first limb that faces away from the second limb, and the spring can be connected with one end to the end portion of the base plate and with the other end to an end of the locking lever protruding beyond the upright first limb. Through the proposed solution, the upright first limb forms the pivot bearing and the upright second limb forms a support for the locking lever if it is not located in the engagement position of the gearing of the control disk, i.e., in the release position of the control disk.

It is further proposed that the locking lever is pivotably mounted about an axis of rotation arranged in the upright first limb. As a result, the moments acting in the mounting or in the locking lever and in the limb can be reduced.

Furthermore, the coil can preferably have electrical contact points which are integrally molded onto the coil body. The integrally molded contact points enable a simplified electrical connection of the electromagnet to an external voltage source or an external control unit.

BRIEF DESCRIPTION OF THE DRAWINGS

The invention is explained below on the basis of preferred embodiments with reference to the accompanying figures. They show:

FIG. 3 is an exploded view of an electrically actuatable locking device according to the prior art, and FIG. 4 is an exploded view of a further developed, electrically actuatable locking device according to the invention, and FIG. 5 shows an electrically actuatable locking device according to the prior art in a sectional view with an attracted and deflected locking lever, and FIG. 6 shows a further developed, electrically actuatable locking device according to the invention in a sectional view with an attracted and deflected locking lever, and FIG. 7 shows a further developed, electrically actuatable locking device according to the invention in two different oblique views.

DETAILED DESCRIPTION

Figure 2:
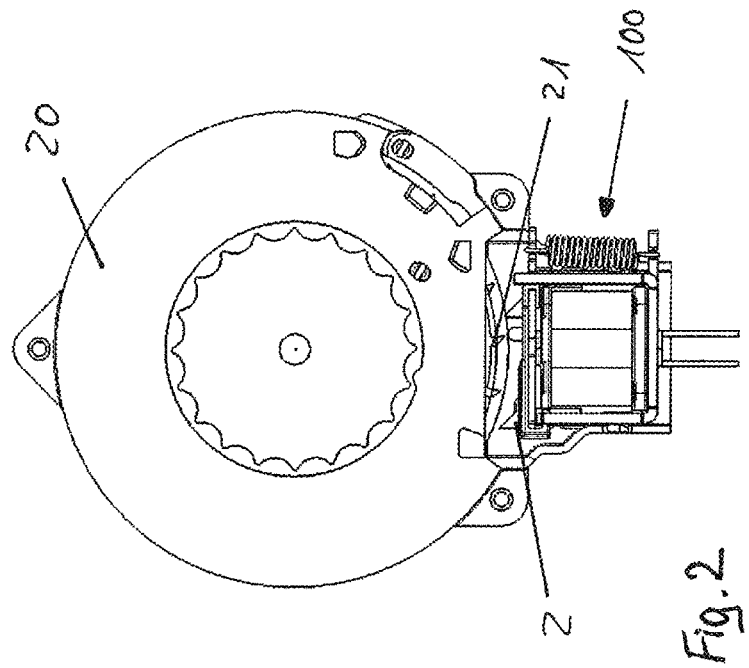
FIG. 2 shows a belt retractor according to the invention having a released control disk.
Figure 1:
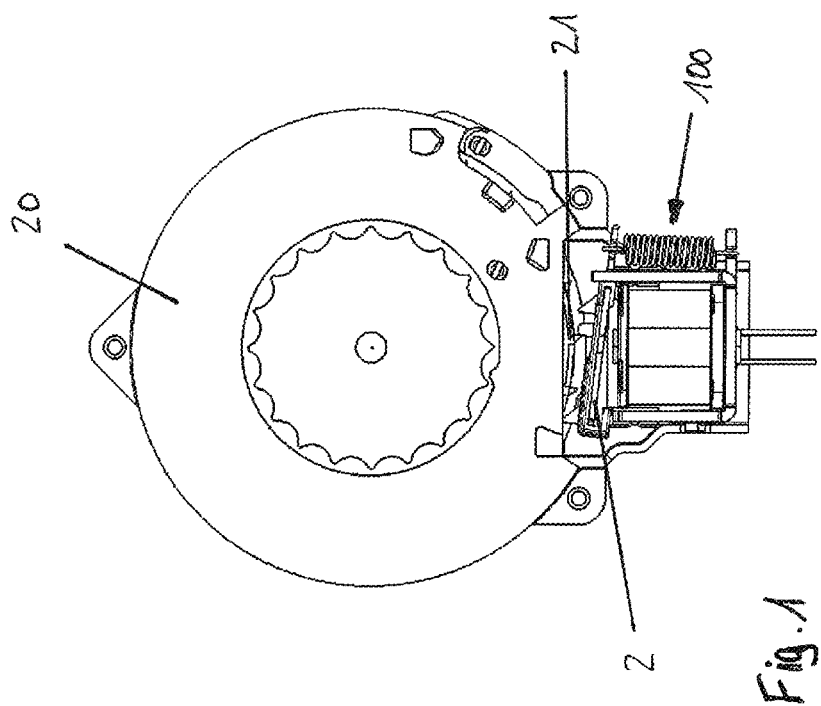
FIG. 1 shows a belt retractor according to the invention having a locked control disk.

In FIGS. 1 and 2, a belt retractor having a housing 20 and a control disk 21 covered by the housing 20 can be seen in each case. The control disk 21 is mounted rotatably on a belt shaft (not shown) in a known manner and is spring-biased in the winding direction with respect to said belt shaft by means of a spring. Furthermore, an electrically actuatable locking device 100 having a locking lever 2 is provided on the belt retractor, which locking lever, by an engagement in the gearing of the control disk 21, which engagement is recognizable in the left-hand illustration, forces a locking pawl mounted on the belt shaft into a gearing fixed to the housing to generate an actuating movement during a further extraction movement of the belt shaft, as a result of which the belt shaft is in turn locked with respect to a further extraction movement.

FIG. 4 shows the further developed, electrically actuatable locking device 100 according to the invention, which comprises a housing 1 and an electromagnet 3. The housing 1 comprises a base plate 15 and a first limb 16 that is upright on one side of the base plate 15. Furthermore, the housing 1 comprises an upright second limb 19, which supplements the housing 1 with the formation of an intermediate space relative to the upright first limb 16 to form a U-shaped profile. The upright first and second limbs 16, 19 can be integrally formed with the base plate 15 or alternatively also caulked with the base plate 15.

Furthermore, a base component 6 is provided with a central portion 7 and two radial flanges 8, wherein an intermediate space 9 in which a coil 10 is arranged is provided between the radial flanges 8. The base component 6 comprises two electrical lines 11 which are connected to the coil 10 via contacts 18. In a through opening 14 of the base component 6, two iron cores 12 and 17 are provided which are caulked in corresponding openings of the base plate 15 of the housing 1.

The locking lever 2, which is formed by a steel plate 5 and a contour part 24, is arranged on the upper side of the locking device 100. The contour part 24 can be clipped or else integrally molded onto the steel plate 5 and forms therewith the locking lever 2 as a composite component.

The base plate 15 has an end portion 22 which protrudes outward beyond the upright first limb 16. The steel plate 5 of the locking lever 2 also has an end 23 protruding beyond the first limb 16. The end 23 and the end portion 22 serve for the attachment of a tension spring 4.

The locking lever 2 is pivotably mounted with the steel plate 5 on the upright first limb 16 so that the spring 4 pulls the locking lever 2 into a pivoted-out locking position recognizable in the left-hand illustration of FIG. 6, when the electromagnet 3 is deactivated. When the electromagnet 3 is activated, the locking lever 2 is attracted to the iron cores 12 and 17 in the position shown in the right-hand illustration of FIG. 6, and a second magnetic circuit Il is additionally closed in addition to the first magnetic circuit I.

The advantage of the proposed solution is recognizably that a second magnetic circuit Il is created by the second limb 19 and the second iron core 17 and exerts an additional force on the locking lever 2 without the parts involved having to be of larger dimensions or the locking device 100 as such becoming larger. Rather, previously unused portions of the base plate 15 and of the locking lever 2 or of the steel plate 5 are used to generate the retraction force. In this case, the upright second limb 19 and the second iron core 17 are of particular importance because a second yoke is created thereby in addition to the yoke formed by the upright first limb 16 and the first iron core 12. In this case, the steel plate 5 forms a pivot armature, by means of which both the first magnetic circuit I and the second magnetic circuit Il are closed by attracting the locking lever 2 when the electromagnet 3 is energized.

Furthermore, two damping elements 13 are formed on the contour part 24 in the form of identical elastic hooks, which are arranged in parallel to one another and protrude beyond the edge of the steel plate 5. The damping elements 13 are shaped such that the locking lever 2 comes into contact exclusively via the damping elements 13 with the housing 1 or with the upright second limb 19.

The locking lever 2 is formed by a pivotable plate in the form of the steel plate 5 with the contour part 24 held thereon. The hooks are part of the contour part 24 and are identically formed and arranged in parallel to one another. Furthermore, recesses 25 are provided on the second limb 19 of the housing 1, into which recesses the hooks dip in the position of the locking lever 2 attracted by the electromagnet 3. The recesses 25 provide corresponding free spaces into which the hooks can dip without hindering the movement of the locking lever 2.

Furthermore, the contour part 25 on the steel plate 5 has a bent elastic locking tip 27, which is shaped by the bend such that an intermediate space 26 is present between the locking tip 27 and the steel plate 5. This intermediate space 26 and the elastic properties of the locking tip 27 enable the locking tip 27 to generate a deflection to the steel plate 5 and thus a dampened triggering of the locking movement. Furthermore, in the case of a tooth-on-tooth position with the gearing of the control disk 21, the locking tip 27 can carry out small diverting movements, whereby a pseudo-locking can be prevented.

Both the new damping and shaping of the locking lever 2 and the new design of the electromagnet 3 represent independent inventions which further develop the locking device 100 independently of one another.

The invention claimed is:

1. A belt retractor having an electrically actuatable locking device, the belt retractor comprising:
    a housing with a base plate and an upright first limb,
    a locking lever mounted pivotably on the upright first limb and having a steel plate which is spring-loaded by means of a spring, and
    an electromagnet arranged in the housing and having
    a coil with a through opening, and
    a first iron core which is arranged in the through opening and which, when a voltage is applied to the coil, exerts a magnetic force on the locking lever via the steel plate and actuates said locking lever for triggering a locking or unlocking movement against the force of the spring, wherein
    the movement of the locking lever is enforced by a first magnetic circuit, which is formed by the first iron core, the upright first limb, and the portions of the base plate and of the locking lever between the first iron core and the upright first limb, wherein
    a damping element is provided, which is arranged in such a way that it damps the movement of the locking lever relative to the housing in at least one portion of the movement curve of the locking lever, and
    wherein
    the damping element is formed by at least one elastically deformable hook arranged on the locking lever.

2. The belt retractor according to claim 1, wherein the hook is formed by a plastic hook integrally molded onto the locking lever.

3. The belt retractor according to claim 1, wherein at least one recess is provided on the housing, into which the hook dips during its movement in at least one position.

4. The belt retractor according to claim 1, wherein at least two hooks of identical shape are provided and are oriented in parallel to one another.

5. The belt retractor according to claim 1, wherein the locking lever is formed by a pivotable plate on which an elastic, projecting, bent locking tip is provided.

6. The belt retractor according to claim 1, wherein
an upright second limb is provided on the edge side of the base plate opposite the first limb,
a second iron core is arranged in the through opening, and
the movement of the locking lever is additionally enforced upon activation of the electromagnet by a second magnetic circuit, which is formed by the second iron core, the upright second limb, and the portions of the locking lever and of the base plate between the second limb and the second iron core.

7. The belt retractor according to claim 6, wherein the first and second iron cores are caulked in the base plate of the housing.

8. The belt retractor according to claim 6, wherein the upright first and/or second limbs are integrally formed with the base plate.

9. The belt retractor according to claim 6, wherein
the base plate has an end portion which is arranged on the side of the first limb that faces away from the second limb, and
the spring is connected with one end to the end portion of the base plate and with the other end to an end of the locking lever protruding beyond the first limb.

10. The belt retractor according to claim 6, wherein the locking lever is pivotably mounted about an axis of rotation arranged in the first limb.

11. The belt retractor according to claim 6, wherein the coil has electrical contact points which are integrally molded onto the coil body.

12. A belt retractor having an electrically actuatable locking device, the belt retractor comprising:
a housing with a base plate and an upright first limb;
a locking lever mounted pivotably on the upright first limb and having a steel plate which is spring-loaded by means of a spring; and
an electromagnet arranged in the housing, the electromagnet comprising:
a coil with a through opening, and
a first iron core which is arranged in the through opening and which, when a voltage is applied to the coil, exerts a magnetic force on the locking lever via the steel plate and actuates said locking lever for triggering a locking or unlocking movement against the force of the spring,
wherein the movement of the locking lever is enforced by a first magnetic circuit, which is formed by the first iron core, the upright first limb, and the portions of the base plate and of the locking lever between the first iron core and the upright first limb,
wherein a damping element is provided, which is arranged in such a way that it damps the movement of the locking lever relative to the housing in at least one portion of the movement curve of the locking lever,
wherein the damping element is formed by at least one elastically deformable hook arranged on the locking lever, and
wherein an upright second limb is provided on the edge side of the base plate opposite the first limb and a second iron core is arranged in the through opening, and the movement of the locking lever is additionally enforced upon activation of the electromagnet by a second magnetic circuit, which is formed by the second iron core, the upright second limb, and the portions of the locking lever and of the base plate between the second limb and the second iron core.

* * * * *